United States Patent [19]

Franks

[11] 4,453,625

[45] Jun. 12, 1984

[54] CONCENTRIC SHAFT DRIVE

[75] Inventor: Charles G. Franks, Pampa, Tex.

[73] Assignee: Ingersoll-Rand Company, Woodcliff Lake, N.J.

[21] Appl. No.: 309,215

[22] Filed: Oct. 7, 1981

[51] Int. Cl.³ ............................................. F16D 25/04
[52] U.S. Cl. ................................ 192/88 B; 192/110 R
[58] Field of Search ......................... 192/88 B, 110 R

[56] References Cited

U.S. PATENT DOCUMENTS

| | | | |
|---|---|---|---|
| 2,214,164 | 9/1940 | Fawick | 192/88 B |
| 2,304,030 | 12/1942 | Schmitter | 192/88 B |
| 2,304,032 | 12/1942 | Schmitter | 192/88 B |
| 2,311,597 | 2/1943 | Schmitter | 192/88 B X |
| 2,710,087 | 6/1955 | Picard | 192/88 B |
| 2,803,973 | 8/1957 | Ashton | 192/88 B |
| 3,435,694 | 4/1969 | Phinney | 192/88 B |

Primary Examiner—Rodney H. Bonck
Assistant Examiner—David D. House
Attorney, Agent, or Firm—Walter C. Vliet

[57] ABSTRACT

This invention pertains to a shaft drive arrangement having an inner shaft which has a first end and a second end. There is also an outer shaft concentric about the inner shaft. The outer shaft has a first end, a second end, and a middle. A clutch means for transmitting rotary power between the inner shaft and outer shaft is provided. The clutch means is cantileverly mounted on the second end of the shafts. A first transmission means for transmitting torque is mounted on the second end of the inner shaft. A second transmission means for transmitting torque is mounted about the middle of the outer shaft.

9 Claims, 1 Drawing Figure

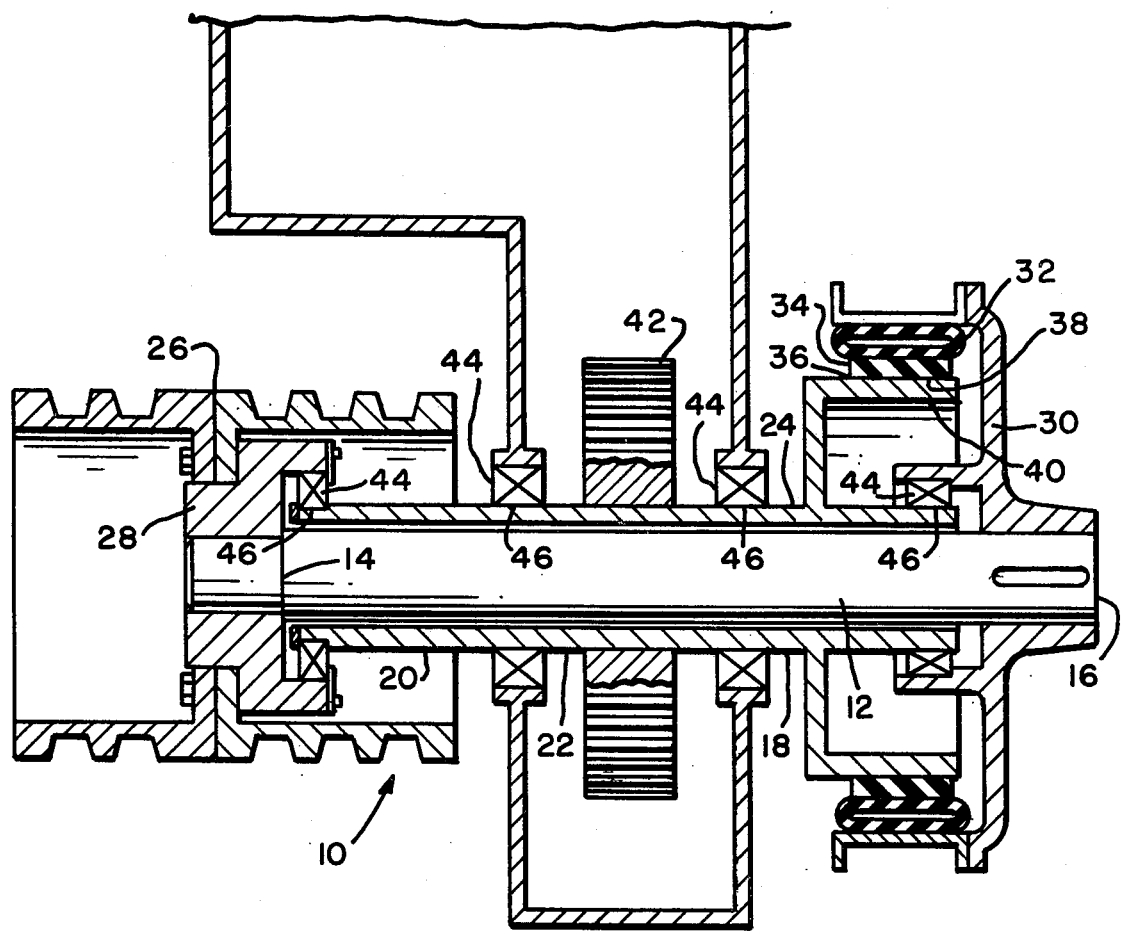

CONCENTRIC SHAFT DRIVE

BACKGROUND OF THE INVENTION

This invention pertains to a drive shaft arrangement and, more particularly, to a drive shaft arrangement having an inner shaft, an outer shaft concentric about the inner shaft, a clutch means, and a first and second transmission means.

In power transmitting applications, such as in the case of drilling rig applications, it is desired to have drive shaft arrangements which are as compact as possible. In the case of drill rigs, there is limited room on the rig, and the rig must be transported from place to place putting size requirements on the shaft size.

SUMMARY OF THE INVENTION

This invention pertains to a shaft drive arrangement having an inner shaft wherein the inner shaft has a first end and a second end. An outer shaft concentric about the inner shaft is also provided. The outer shaft has a first, a middle and a second end. A clutch means for transmitting rotary power between the inner shaft and the outer shaft is cantileverly mounted on the second end of the shaft. A first transmission means for transmitting torque is mounted on the second end of inner shaft and a second transmission means for transmitting torque is mounted about the middle of the outer shaft.

BRIEF DESCRIPTION OF THE DRAWING

The FIGURE is a cross section, schematic illustration of a shaft drive arrangement.

DESCRIPTION OF THE PREFERRED EMBODIMENT

In the FIGURE, a shaft drive arrangement 10 is shown. Shaft drive arrangement 10 is comprised of an inner shaft 12 which has a first end 14 and a second end 16. An outer shaft 18 is positioned concentric about the inner shaft 12. Outer shaft 18 has a first end 20, a middle 22, and a second end 24. A first transmission means for transmitting torque is mounted on first end 14 of inner shaft 12. First transmission means include conventional transmission means such as sheave 26 which is connected to inner shaft 12 by means of member 28. In this embodiment of the invention, sheave 26 drives inner shaft 12. Inner shaft 12 then becomes the driver shaft. The invention, however, is not limited to this embodiement, and inner shaft 12 may be the driven shaft. Mounted on second end 16 and second end 24 of the shafts is a clutch means for transmitting rotary power between inner shaft 12 and outer 18. The clutch means is cantileverly mounted on the second end of the shafts. The clutch means includes conventional clutch means such as the embodiment shown in the figure. In this embodiment there is a member 30 mounted on the second end of shaft 12. Attached to member 30 is an inflatable ring 32. Inflatable ring 32 may be inflated with pneumatic pressure. Attached to inflatable ring 32 is a contact ring 34 which has a contact surface 36. When ring 32 is inflated, contact surface 36 presses against a contact surface 38. Contact surface 38 is part of member 40 which is affixed to second end 24 of outer shaft 18. When the clutch is engaged, the outer shaft 18 rotates as does the inner shaft 12. Connected to middle section 22 of outer shaft 18 is a second transmission means for transmitting torque. Second transmission means includes conventional transmission means such as sprocket 42 shown in the drawing. In this embodiment of the invention, sprocket 42 is driven by outer shaft 18. This invention, however, includes means wherein outer shaft 18 is driven by second transmission means 42. Bearings 44 are mounted on journals 46 to permit rotation of outer shaft 18.

It has been found when the present invention is employed a very compact space-conserving design is used. The design allows for relatively small diameter shafts for long spans. Large diameter bearings can be used without increase of shaft size. The clutch driven members are cantilevered and open for easy service. The inner shaft is placed in pure torsion. All bending moments are on the outer shaft. Bearings are mounted on journals external to the outer shaft eliminatinng any bearings on the inner shaft.

I claim:

1. A shaft drive arrangement comprising:
   (a) an inner shaft having a first end and a second end;
   (b) an outer shaft concentric about the inner shaft having a first end, a second end, and a middle;
   (c) a clutch means for transmitting rotary power between the inner shaft and the outer shaft with said clutch means cantileverly mounted on the second end of each shaft;
   (d) a first transmission means for transmitting torque to said inner shaft connected to the first end of the inner shaft; and
   (e) a second transmission means for transmitting torque mounted about the middle of the outer shaft,
   (f) first means for mounting said first transmission means including bearing means whereby radial and bending loads on said first transmission means are removed from said inner shaft,
   (g) wherein said clutch means comprises a first member for transmitting torque from said inner shaft to a clutch engaging and disengaging means, and a second clutch member for transmitting torque from the clutch engaging and disengaging means, and
   (h) second means for mounting said first member including bearing means whereby radial and bending loads on said first member are transmitted and thereby removed from said inner shaft.

2. A shaft drive arrangement according to claim 1 wherein the inner shaft is the driver shaft.

3. A shaft drive arrangement according to claim 1 wherein the outer shaft is the driven shaft.

4. A shaft drive arrangement according to claim 1 wherein the clutch means comprises a first member affixed to the inner shaft, an inflatable ring affixed to the first member, said inflatable ring having a first surface contacting a second surface of a second member affixed to the outer shaft.

5. A shaft drive arrangement according to claim 1 wherein the first transmission means is a sheave.

6. A shaft drive arrangement according to claim 1 wherein the second transmission means is a sprocket.

7. A shaft drive arrangement according to claim 1 wherein bearings are provided and mounted on journals external to the outer shaft.

8. A shaft drive arrangement according to claim 1 wherein only torsional loads are applied to said inner shaft.

9. A shaft drive arrangement according to claim 1 wherein all bearing mountings for said inner shaft are external to said outer shaft through said first and second means for mounting thereby permitting minimum radial clearance between said inner shaft and said outer shaft.

* * * * *